US012810205B2

(12) United States Patent
Sankararaman

(10) Patent No.: US 12,810,205 B2
(45) Date of Patent: Nov. 24, 2026

(54) UNCERTAINTY QUANTIFICATION IN PREDICTIONS OF BINARY CLASSIFICATION MODELS

(71) Applicant: Intuit, Inc., Mountain View, CA (US)

(72) Inventor: Shankar Sankararaman, Burlingame, CA (US)

(73) Assignee: Intuit Inc., Mountain View, CA (US)

( * ) Notice: Subject to any disclaimer, the term of this patent is extended or adjusted under 35 U.S.C. 154(b) by 391 days.

(21) Appl. No.: 18/419,158

(22) Filed: Jan. 22, 2024

(65) Prior Publication Data

US 2025/0238709 A1 Jul. 24, 2025

(51) Int. Cl.
*G06N 20/00* (2019.01)

(52) U.S. Cl.
CPC .................................... *G06N 20/00* (2019.01)

(58) Field of Classification Search
CPC ...................................................... G06N 20/00
See application file for complete search history.

(56) References Cited

U.S. PATENT DOCUMENTS

| | | | | |
|---|---|---|---|---|
| 11,429,823 | B1 * | 8/2022 | Lan | G06N 5/01 |
| 11,494,701 | B1 * | 11/2022 | Resheff | G06F 16/9535 |
| 11,676,037 | B1 * | 6/2023 | Merrill | G06N 3/084<br>706/25 |
| 11,704,566 | B2 * | 7/2023 | Ma | G06F 11/3495<br>706/12 |
| 11,816,550 | B1 * | 11/2023 | Gupta | G06N 5/01 |
| 11,891,882 | B2 * | 2/2024 | Zhang | E21B 43/00 |
| 11,977,836 | B1 * | 5/2024 | Archambeau | G06F 40/20 |
| 11,977,993 | B2 * | 5/2024 | Guzik | G06N 7/01 |
| 11,989,626 | B2 * | 5/2024 | Arnold | G06N 20/00 |
| 12,067,502 | B1 * | 8/2024 | Stave | G06N 5/04 |
| 12,229,691 | B2 * | 2/2025 | Das | G06N 5/022 |
| 12,265,889 | B2 * | 4/2025 | Nia | G06N 7/01 |
| 12,361,095 | B2 * | 7/2025 | Ghanta | G06F 17/18 |
| 12,412,124 | B2 * | 9/2025 | Niu | G06N 20/00 |
| 12,450,525 | B2 * | 10/2025 | Padmanabhan | G06N 20/20 |
| 12,505,386 | B1 * | 12/2025 | Carnell | G06N 20/00 |
| 12,518,137 | B2 * | 1/2026 | Lin | G06N 3/045 |
| 12,548,083 | B1 * | 2/2026 | Martinez | G06Q 30/0631 |
| 12,555,060 | B2 * | 2/2026 | Baviskar | G06Q 10/06393 |
| 12,608,446 | B2 * | 4/2026 | Niu | G06F 18/214 |
| 12,619,896 | B2 * | 5/2026 | Phillip | G01V 20/00 |
| 12,632,793 | B2 * | 5/2026 | Monaghan | G06N 5/02 |
| 12,646,346 | B2 * | 6/2026 | Maiman | G06F 40/44 |
| 2018/0293501 | A1 * | 10/2018 | Ambati | G06N 20/00 |
| 2018/0341246 | A1 * | 11/2018 | Coffman | G06N 5/04 |
| 2019/0019106 | A1 * | 1/2019 | Driscoll | G06N 20/00 |
| 2019/0339669 | A1 * | 11/2019 | Coffman | G05B 19/4097 |
| 2020/0151547 | A1 * | 5/2020 | Valpola | G06N 3/045 |
| 2020/0311601 | A1 * | 10/2020 | Robinson | G06N 20/00 |

(Continued)

*Primary Examiner* — David E Choi
(74) *Attorney, Agent, or Firm* — Dinsmore & Shohl LLP

(57) ABSTRACT

Certain aspects of the disclosure provide systems and methods for uncertainty quantification of binary classification models. A method may include generating a plurality of sample predictions with a plurality of machine learning models, where each respective sample prediction of the plurality of sample predictions is associated with a respective model of the plurality of machine learning models. A probability distribution is fitted to the plurality of sample predictions. A classification label is determined based on the probability distribution.

20 Claims, 5 Drawing Sheets

(56) References Cited

U.S. PATENT DOCUMENTS

2021/0027116 A1* 1/2021 Monaghan ............. G06N 20/00
2021/0027193 A1* 1/2021 Monaghan ............. G06N 20/20
2021/0073669 A1* 3/2021 Banerjee ................ G06N 3/045
2021/0158075 A1* 5/2021 Shoshan ............. G06F 18/2113
2021/0241131 A1* 8/2021 Khawas ................ G06F 16/214
2021/0279612 A1* 9/2021 Jarrett .................... G06N 20/00
2021/0295204 A1* 9/2021 Bhide ...................... G06N 5/04
2021/0383224 A1* 12/2021 Chen ........................ G06N 3/08
2022/0004897 A1* 1/2022 Jadon ..................... G06N 3/045
2022/0004919 A1* 1/2022 Zhang .................... G01V 20/00
2022/0129707 A1* 4/2022 Jog ....................... G06F 18/217
2022/0129788 A1* 4/2022 Zhang ..................... E21B 44/02
2022/0148731 A1* 5/2022 Hawkins-Daarud ... G06N 20/10
2022/0180246 A1* 6/2022 Mondal .................. G06N 20/00
2022/0245707 A1* 8/2022 Bathe ..................... G06N 20/20
2022/0245713 A1* 8/2022 Bathe ..................... G06N 20/00
2022/0253554 A1* 8/2022 Goldsteen ........... G06F 21/6254
2022/0366280 A1* 11/2022 Rowe ....................... G06N 5/04
2022/0405619 A1* 12/2022 Ramamurthy .... G06F 16/24568
2022/0405650 A1* 12/2022 Liu ....................... G06F 18/217
2023/0019779 A1* 1/2023 Santana De Oliveira ................... G06F 21/6245
2023/0026174 A1* 1/2023 Bathe ..................... G06N 20/20
2023/0047184 A1* 2/2023 Truong ............... G06F 18/2415
2023/0068373 A1* 3/2023 Zhang ................... G06F 18/211
2023/0109108 A1* 4/2023 Banerjee .................. G06N 3/02 705/2
2023/0124380 A1* 4/2023 Goldszmidt .......... G06F 18/217 706/12
2023/0129390 A1* 4/2023 Fusco ...................... G06N 5/01 706/12
2023/0136738 A1* 5/2023 Jiang ..................... G06F 16/217 707/713
2023/0152805 A1* 5/2023 Bramley .................. G05D 1/00 706/15
2023/0169323 A1* 6/2023 Kolagunda .............. G06N 3/08 706/25
2023/0177407 A1* 6/2023 Gupta .................... G06N 20/20 706/12
2023/0297453 A1* 9/2023 Viclizki ................. G06N 3/045 714/47.2
2023/0409674 A1* 12/2023 Tanno ................... G06F 18/211
2024/0054358 A1* 2/2024 Ferreira Costa ....... G06N 5/022
2024/0062080 A1* 2/2024 Mandapaka ........... G06N 5/022
2024/0153275 A1* 5/2024 Jagadeesan ............ G06V 20/53
2024/0177068 A1* 5/2024 Fusting .................. G06N 20/00
2024/0177071 A1* 5/2024 Wang ................... G06N 3/0442
2024/0220847 A1* 7/2024 Mishra ................ G06F 11/3452
2024/0220861 A1* 7/2024 Agarwal ................ G06N 20/00
2024/0232711 A1* 7/2024 Oliver .................... G06N 20/00
2024/0256968 A1* 8/2024 Hosseinzadeh ........ G06N 20/00
2024/0265304 A1* 8/2024 Dahlem ................. G06N 20/00
2024/0289645 A1* 8/2024 Makhijani ................ G06N 5/01
2024/0303503 A1* 9/2024 Everett .................. G06N 3/045
2024/0320546 A1* 9/2024 Palomera ............... G06N 3/045
2024/0330413 A1* 10/2024 Hamzeh ................ G10L 15/197
2024/0330780 A1* 10/2024 Ramrakhiyani ....... G06N 3/045
2024/0394595 A1* 11/2024 Schierz ................... G06F 16/22
2024/0403729 A1* 12/2024 Jazbec ................... G06N 20/20
2024/0428088 A1* 12/2024 Selim ..................... G06N 20/00
2024/0428123 A1* 12/2024 Sharpe ................... G06N 5/022
2025/0005447 A1* 1/2025 Veer ......................... G06N 7/01
2025/0131340 A1* 4/2025 Xu ........................ G06F 18/214
2025/0156750 A1* 5/2025 Sengupta ................. G06N 7/01
2025/0181923 A1* 6/2025 Valluru .................. G06N 3/084
2025/0232207 A1* 7/2025 Owen .................... G06N 20/00
2025/0272585 A1* 8/2025 Wang ..................... G06N 3/045
2025/0278674 A1* 9/2025 Twieg .................... G06N 3/045
2025/0308640 A1* 10/2025 Bauchy ............... C04B 40/0032
2025/0322314 A1* 10/2025 Han ....................... G06N 20/20
2026/0057276 A1* 2/2026 Schleeper .............. G06N 10/60
2026/0106879 A1* 4/2026 Zhou ................... H04L 63/1416

* cited by examiner

UNCERTAINTY QUANTIFICATION IN PREDICTIONS OF BINARY CLASSIFICATION MODELS

BACKGROUND

Field

Aspects of the present disclosure relate to uncertainty quantification in predictions of binary classification models.

Description of Related Art

Binary classification seeks to assign a given input to one of two classes (e.g., a positive class label or a negative class label). Many machine learning model approaches assign a class label by determining, either explicitly or implicitly, the probability that the input belongs to the positive class given the features associated with the input used by the model. There are many different modeling approaches that may be used, for example, linear modeling, tree-based modeling, neural network modeling, deep learning methods, and the like.

There are many applications for binary classification. Some examples include predicting risk, fraud, propensity for customers to purchase a given product, ad-click prediction, spam prediction, and many more. Often class labels inform decision-making. As a simple example, for a spam prediction, if a given email assigned a class label of spam, then the email is moved to a spam folder.

Some modeling techniques explicitly determine the probability the input belongs to the positive class, for example, the email has a 60% probability of being spam. However, a technical problem exists in binary classification in which it is often difficult to quantify how certain the model is in the probability determination. The model may determine the email has a 60% probability of being spam, but if the model is very uncertain in its prediction, output of the model should not be relied upon for taking action with regard to the email (e.g., to avoid a false positive in which a user misses an email incorrectly labeled as spam).

In many cases, determining the uncertainty of the model is as critical as assigning the class label. This allows risk-informed decision making and depending on the use-case, informs whether a particular action should be taken. Uncertainty quantification enables risk assessment and increases reliability of classification models.

Accordingly, there is a need in the art for improved methods of quantifying uncertainty in classification modeling.

SUMMARY

Certain aspects provide a method for quantifying uncertainty, comprising: processing an input with a plurality of machine learning models to output a plurality of sample predictions, each respective sample prediction of the plurality of sample predictions being outputted by one respective machine learning model of the plurality of machine learning models; fitting a beta distribution to the plurality of sample predictions for the input, comprising: estimating a first hyperparameter for the beta distribution; and estimating a second hyperparameter for the beta distribution; and outputting a probability distribution for the input based on the beta distribution.

Other aspects provide processing systems configured to perform the aforementioned methods as well as those described herein; non-transitory, computer-readable media comprising instructions that, when executed by a processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
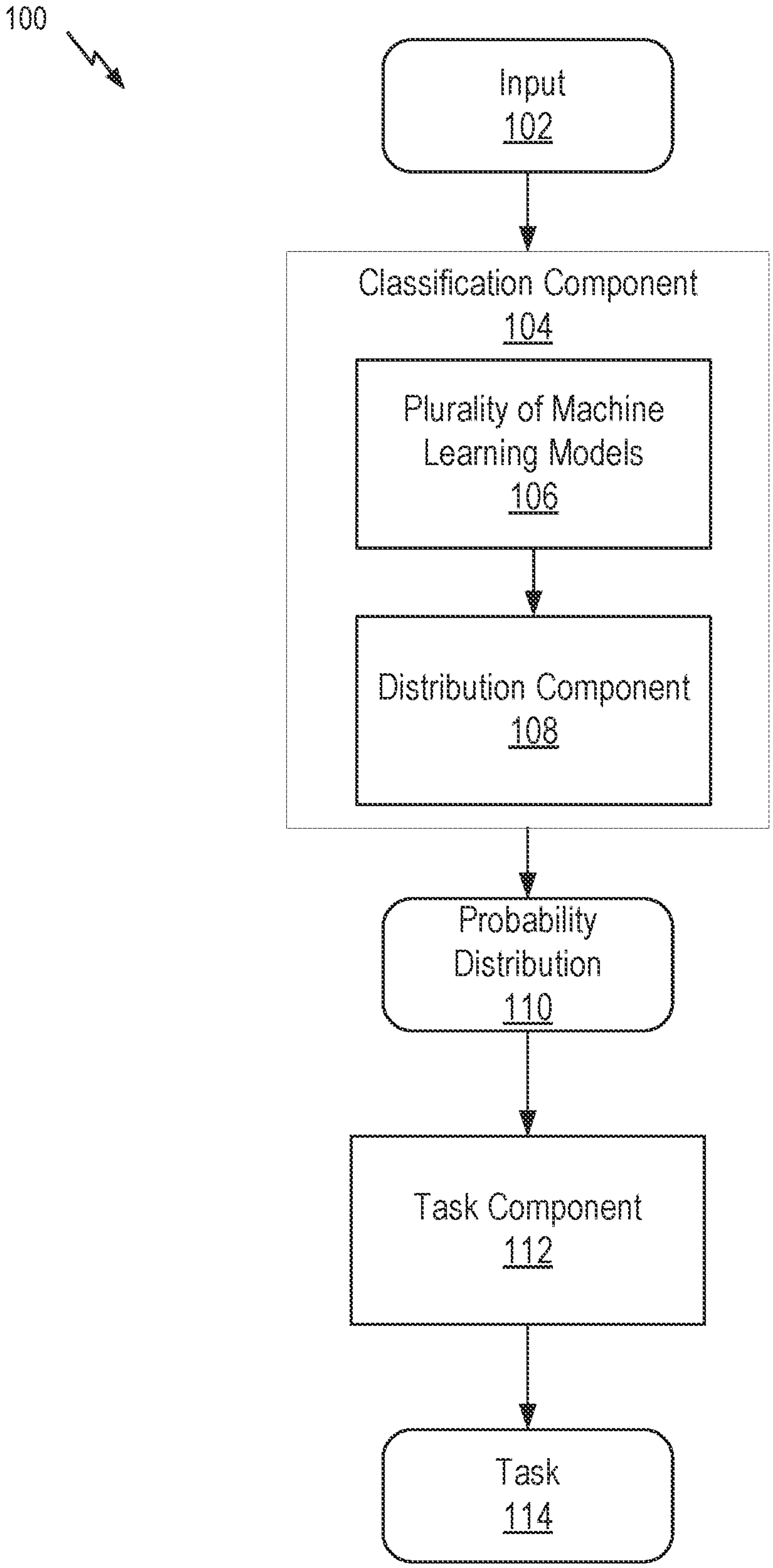
FIG. 1 depicts an example system for quantifying uncertainty of a binary classification.

Aspects of the present disclosure provide apparatuses, methods, processing systems, and computer-readable mediums for uncertainty quantification in predictions of binary classification models by generating a probability distribution for a predicted binary classification.

As described herein, quantifying uncertainty in modeling, in particular, classification modeling is an imperative for risk-informed decision-making. Some current methods quantify uncertainty by focusing on uncertainty in the model, for example, errors due to hyperparameters, over-parameterization, sampling methods, model misspecification and the like. Other methods are applicable for regression methods, but cannot be applied to classification models. Additional methods rely on computationally intensive approaches, such as Markov chain Monte Carlo sampling of posterior distributions of neural network hyperparameters. Other methods are restricted to certain model types.

These methods for uncertainty quantification have many technical shortcomings including focus on errors in method design, computationally-intensive, and restriction to only certain model types. Further, some methods generate only a point-estimate probability, which only gives a single estimate of the parameter value, or the predicted binary classification, without any estimate of confidence.

Aspects described herein overcome these technical problems by providing systems and methods for uncertainty quantification for many types of binary classification models. In aspects described herein, uncertainty is quantified for a binary class prediction by generating the probability distribution for the assigned binary class prediction for a given input. For example, for a given email, the probability of the email being spam may be determined as having a mean of 0.8 and a standard deviation of 0.02, which indicates the true probability of the email being spam is closer to 1, and has a small variance, indicating higher certainty. As another example, for a give email, the probability of the email being spam may be determined as having a mean of 0.8 and a standard deviation of 0.2, which indicates the true probability of the email being spam is closer to 1, however, it has a large variance, indicating less certainty.

In certain aspects, a plurality of classification machine learning models generate a plurality of sample predictions for an input. A beta distribution is generated around the plurality of sample predictions. The complete beta distribution is generated to provide the distribution and variance around the assigned binary class prediction. Many technical benefits are achieved by the aspects described herein.

One technical benefit is achieved by generating a complete probability distribution. The complete probability distribution for the assigned binary class prediction enables risk-informed decision-making and improves any follow-on analysis. In cases where the probability distribution for the assigned binary class prediction has a small variance, this indicates increased confidence in the binary class prediction. In cases where the probability distribution for the assigned binary class prediction has a large variance, decreased confidence in the binary class label is indicated. Beneficially, this confidence informs the uncertainty (or certainty) in the assigned binary class prediction, improving follow-on analysis because the amount of confidence can be used to make decisions by computing the variance. In fact, the entire probability distribution can also be used to compute probability bounds or percentiles. For example, in conventional systems without uncertainty estimation, a fraud-detection classification algorithm may conventionally require a threshold, such as "if the fraud probability is greater than 0.1, then flag the transaction as fraud." However, with the additional uncertainty estimates, as described herein, enables determining "if the fraud probability is greater than 0.1, and the variance is less than 0.05, then flag the transaction as fraud."

Furthermore, the entire probability distribution can also be used. For example, in the problem of predicting fraudulent transactions, instead of using the mean prediction to make decisions, the 10-percentile bound or the 90-percentile bound may be used. In such use cases, it may be desirable to increase recall or increase precision. Often, there is an inverse relationship between the two of them. Precision is the ratio of number of flagged predictions to total number of predictions, and improving precision leads to reducing false positives (e.g., flagging a non-fraudulent transaction as fraudulent). Recall is the ratio of number of flagged predictions to the total number of truly fraudulent transactions, and improving recall leads to reducing false negatives (e.g., not flagging a fraudulent transaction). In some cases, where the goal is to reduce false positives, then the classification task has more precision (a perfect precision of 1 implies there are no false positives), but less recall. As an example, a transaction may be flagged as fraud if the 90-percentile bound for fraud probability is greater than 0.1. Then, fewer transactions will be flagged as fraudulent, thus reducing false positives but increasing false negatives. In some cases, where the goal is to reduce false negatives, then the classification task has more recall (a perfect recall of 1 implies that there are no false negatives), but less precision. For example, a transaction may be flagged as fraud if the 10-percentile bound is less than 0.1. Then, more transactions may be flagged as fraudulent, thus flagging more fraudulent transactions, but false positives may increase. Beneficially, then, the probability distribution enables decision making for a variety of use cases because the classification task may be adjusted based on the requirements of the use case.

Another technical benefit is achieved by using a beta distribution. A normal probability distribution cannot be made for a binary class prediction because the binary class prediction is a probability of the positive class, thus bounded between: [0, 1]. Aspects described herein overcome this technical limitation by utilizing a beta distribution. The beta distribution represents all possible values of a probability, as used herein, the probability of the positive class label. Beneficially, a beta distribution is set on the interval [0, 1]; such that it may be used to model a binary class probability distribution.

A beta distribution is shaped by two positive hyperparameters, $\alpha$ and $\beta$. As $\alpha$ and $\beta$ approach zero, the more sparse the distribution becomes and the probability is concentrated around the probability parameter equaling 0 or 1. This is because the beta distribution models the unknown probability parameter, or true value of the binary class prediction for the given input, and $\alpha$ and $\beta$ parameterize the probability density function of this probability parameter. Because there are not closed form solutions for determining $\alpha$ and $\beta$, these hyperparameters must be estimated.

In certain embodiments, $\alpha$ and $\beta$ may be estimated through Maximum Likelihood Estimation (MLE). These hyperparameters may be estimated by maximizing a likelihood function, whereby the point in the hyperparameter space that is maximized by the likelihood function is the estimated hyperparameter. In other words, the hyperparameter values that make the observed data most probable may be selected as the hyperparameters $\alpha$ and $\beta$. Generally, there are no closed-form expressions for MLE of the parameters of an arbitrary probability distribution. However, the MLE method can also be applied, and the hyperparameters $\alpha$ and $\beta$ calculated numerically.

In certain embodiments, $\alpha$ and $\beta$ may be estimated through the method of moments because closed-form expressions can be obtained. Thus, $\alpha$ and $\beta$ may be estimated in a finite number of operations, in a computationally efficient manner.

Furthermore, as described herein, the hyperparameters $\alpha$ and $\beta$ are estimated during the inferencing stage, rather than the training stage. Thus, a closed form expression for the method of moments estimate of $\alpha$ and $\beta$ may be used to support latency requirements during inference and allows for real-time (e.g., near real-time) inference.

An additional technical benefit is achieved because aspects described herein are binary classification model-type agnostic. Beneficially, the systems and methods are not model-type dependent, such that the plurality of machine learning models may utilize any binary classification modeling approach, for example, random forest, xgboost, logistic regression, neural network, etc. In some cases, each model in the plurality of machine learning models may be the same type of model and use a single classification modeling approach. For example, all the models in the plurality of machine learning models may be random forest models. In some cases, two or more models in the plurality of machine learning models may be different types of models and use different classification modeling approaches. For example, one model in the plurality of models may be a random forest model, and a second model in the plurality of models may be an xgboost model. Thus, aspects described herein may be tailored to a particular application by quantifying uncertainty of classification modeling using an approach or approaches best suited for that application.

Example Uncertainty Quantification System

FIG. 1 depicts an example uncertainty quantification system 100 for quantifying uncertainty of a binary classification. Input 102 is processed by classification component 104. Classification component 104 is configured to output a probability distribution 110, comprising a probability distribution for a binary class prediction for input 102. Exemplary classifications include risk prediction, fraud prediction, propensity for customers to purchase a given product, ad-click prediction, and spam prediction, to name a few.

Classification component 104 comprises a plurality of machine learning models 106 and a distribution component 108. The plurality of machine learning models 106 are configured to output a plurality of binary class predictions for input 102. The plurality of machine learning models 106 may comprise two or more binary classification machine learning models. In some embodiments, the plurality of machine learning models 106 comprises greater than 30 machine learning models, greater than 50 machine learning models, greater than 60 machine learning models, greater than 100 machine learning models, less than 30 machine learning models, less than 50 machine learning models, and/or less than 100 machine learning models. In some embodiments, the plurality of machine learning models 106 comprises about 100 machine learning models. The number of machine learning models in the plurality of machine learning models 106 may be based on the use-case and the quality of the beta distribution.

Each model of the plurality of machine learning models 106 is configured to process input 102 and assign a binary class prediction for input 102.

Further, each model of the plurality of machine learning models 106 may be configured to utilize one of a variety of classification approaches, for example, random forest, xgboost, logistic regression, neural network, and the like.

In some embodiments, each model of the plurality of machine learning models 106 is configured to utilize the same classification approach. For example, each model of the plurality of machine learning models 106 is configured to utilize a random forest approach to assign a binary class prediction to input 102. Beneficially, each model utilizes the same architecture whereby training, deployment, and maintenance may be more efficient due to the homogenous approaches for each model.

In some embodiments, two or more models of the plurality of machine learning models 106 are configured to utilize different classification approaches. For example, one model of the plurality of machine learning models 106 is configured to utilize a random forest approach to assign a binary class prediction to input 102, and a different model of the plurality of machine learning models 106 is configured to utilize an xgboost approach to assign a binary class prediction to input 102. Beneficially, different model types advantageously improve bias-variance trade-off because the different architectures may have different strengths, thereby these differing strengths may beneficially be combined and overcome individual limitations for each model type.

As described herein, many benefits are achieved because many different types of classification approaches may be used by the classification component 104. The type or types of modeling approaches used by the plurality of machine learning models 106 to assign binary class predictions to input 102, may beneficially be determined by the use-case for the uncertainty quantification system 100, based on, for example, aspects of input 102, aspects of class predictions, follow-on processes, latency requirements, and the like. For example, a nonlinear classification modeling approach may be used for a nonlinear input. Similarly, a linear classification modeling approach may be used for a linear input.

Distribution component 108 is configured to fit the probability distribution for the plurality of binary class predictions for input 102, which may be outputted as probability distribution 110. The probability distribution may be fit to the plurality of binary class predictions by determining the hyperparameters, as described in further detail with respect to FIG. 3. As described herein, the complete probability distribution for assigned class predictions enables risk-informed decision-making and improves follow-on analysis. A probability distribution describes the probability of different outcomes (here, assigned class predictions) for the data. Different characteristics of the probability distribution may be used to indicate the uncertainty, risk, or confidence in the class predictions assigned by the plurality of machine learning models 106. Thus, by generating the complete probability distribution, the uncertainty may be more fully quantified. Furthermore, different applications may apply more weight or consideration to different attributes of the probability distribution, and the whole probability distribution enables this complete picture.

In some embodiments, the probability distribution 110 generated by distribution component 108 is a beta distribution. The beta distribution models the distribution of probabilities of belonging to either class. As described herein, fitting a beta distribution to the plurality of binary class predictions is advantageous because the binary class predictions are probabilities (e.g., bounded between [0, 1]) and a beta distribution may be set over this interval: [0, 1]. Other types of probability distributions may not be as readily capable of describing the distribution of binary class predictions, such as, for example, a normal distribution because it is not bounded.

In some embodiments, uncertainty quantification system 100 may interface with application programming interface(s) (API(s)) (e.g., mechanisms that enable at least two software components to communicate with each other using a set of definitions and protocols) and/or other tool(s), to interface with follow-on components. For example, uncertainty quantification system 100 may be configured to integrate and/or interface with a task component 112, configured to perform a task 114 based on a class prediction of the probability distribution 110. Task component 112 may be configured to make a determination based on the probability distribution, for example, the 10-percentile bound or the 90-percentile bound may be used; or the variance of the distribution may be used. In some embodiments, task component 122 may be configured based on the type of task 114 to be performed, for example, for a first type of task the determination may be based on the percentile, or for a second type of task the determination may be based on the variance. Beneficially, then, task component 112 may be tailored based on the type of task 114 to be performed. Beneficially, uncertainty quantification system may integrate and/or interface with various task components 112 configured to utilize a binary class prediction. For example, where input 102 comprises transaction data, classification component 104 may be configured to output a probability distribution corresponding to the transaction being fraudulent. Task component 112 may perform a task 114 comprising flagging the transaction as fraudulent, such as "flag the transaction as fraud if the 10-percentile bound for fraud probability is greater than 0.1." As another example, task component 112 may flag the transaction as fraudulent where the fraud probability is greater than 0.1, and the variance is less than 0.05, then flag the transaction as fraud."

Example Uncertainty Quantification Training System

Figure 2:
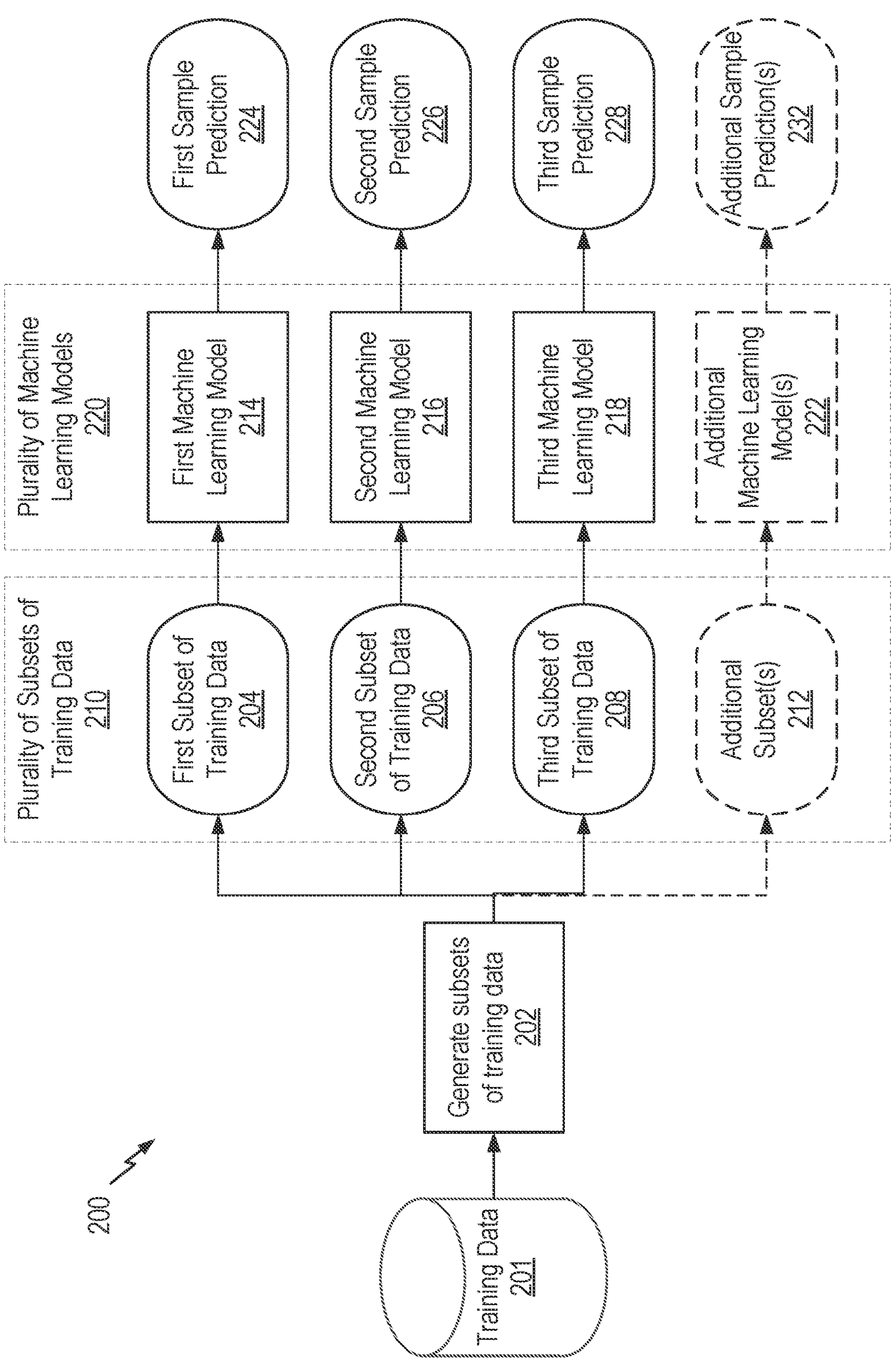
FIG. 2 depicts an example training workflow for training a plurality of machine learning models such as for quantifying uncertainty of a binary classification.

FIG. 2 depicts an example uncertainty quantification training workflow 200 for training a plurality of machine learning models 220, such as the plurality of machine learning models 106 FIG. 1.

Initially, at block 202, a plurality of subsets of training data 210 are generated from training data 201. In this example, three subsets of training data, first subset 204, second subset 206, and third subset 208, are generated, although any number of subsets of training data are contemplated, including one or more additional subsets 212. Each subset of training data may be generated by bootstrapping the training data 201. Bootstrapping the training data 201 comprises using random sampling with replacement to generate the plurality of subsets of training data 210. For example, where training data 201 contains N instances, where N>1, a first subset 204 may be generated by selecting a random sample instance of training data 201, and replacing the selected random sample instance, before selecting a second random sample instance of training data 201. This is repeated N times to generate the first subset of training data 204. Not every instance in training data 201 may be selected to be in first subset 204.

Thus, by generating the plurality of subsets of training data 210 wherein each model of the plurality of machine learning models 220 is trained with a respective subset of training data, uncertainty in the training data is captured in the trained plurality of machine learning models.

A classification learning task is applied to each subset of training data in the plurality of subsets of training data 210 to generate a plurality of machine learning models 220. A classification machine learning model is generated for each subset of the training data, for example, a first machine learning model 214, a second machine learning model 216, and a third machine learning model 218, as well as any additional machine learning model(s), forming the plurality of machine learning models 220. Although depicted here as three models, the plurality of machine learning models 220 may comprise any number of models, for example, 100 models, based on the number of subsets of training data in the plurality of subsets of training data 210.

In some embodiments, each model is of a single type of binary classification model. For example, each of first machine learning model 214, second machine learning model 216, third machine learning model 218 are trained to generate a random forest classification model.

In some embodiments, two or more models are different types of binary classification models. For example, first machine learning model 214 is trained to generate a random forest classification model and second machine learning model 216 is trained to generate an xgboost classification model. As another example, first machine learning model 214 is trained to generate a random forest classification model, second machine learning model 216 is trained to generate an xgboost classification model, and third machine learning model 218 is trained to generate a logistic regression classification model. Any combination of machine learning classification approaches are contemplated herein.

Each model of the plurality of machine learning models 220 is trained to output a binary class prediction. For example, first machine learning model 214 is trained with the first subset 204 to output a first sample prediction 224, second machine learning model 216 is trained with the second subset 206 to output a second sample prediction 226, and third machine learning model 218 is trained with the third subset 208 to output a third sample prediction 228, as well as any additional machine learning model(s) 222 are trained with the corresponding additional subsets of training data to output a respective additional sample prediction 232.

Note that FIG. 2 is just one example of a workflow, and other workflows including fewer, additional, or alternative steps are possible consistent with this disclosure.

Example Inference and Uncertainty Quantification Flow

Figure 3:
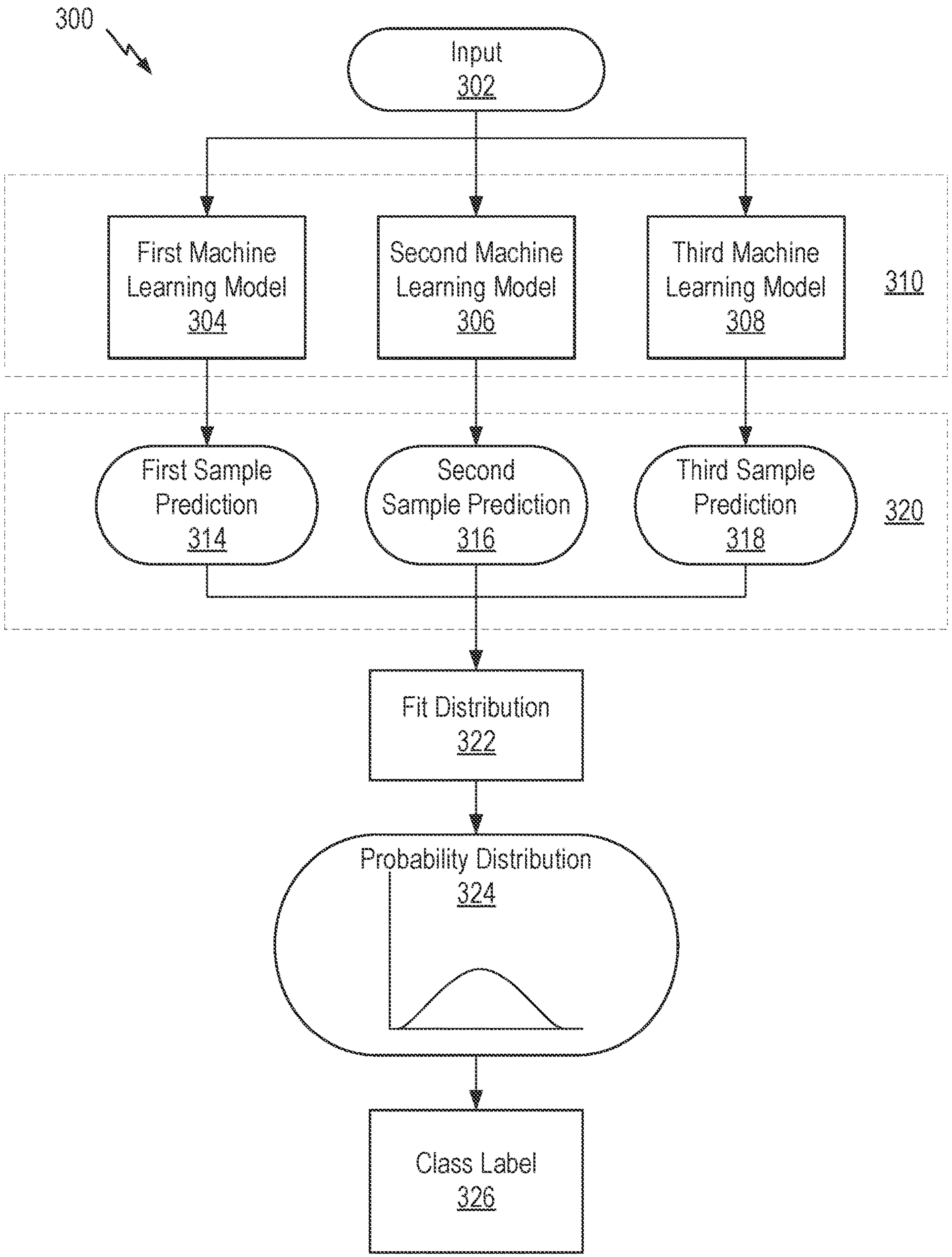
FIG. 3 depicts an example workflow for classifying data with an uncertainty quantification system.

FIG. 3 depicts an example inferencing workflow 300 for classifying data with an uncertainty quantification system, for example, uncertainty quantification system 100 in FIG. 1.

Initially, input 302 is processed by a plurality of classification machine learning models 310 to generate a plurality of sample predictions 320. Each model of the plurality of machine learning models processes input 302 to assign a binary class prediction, for example, as trained in FIG. 2. In this example, the plurality of machine learning models 310 comprises three models that generate three sample predictions. First machine learning model 304 processes input 302 to assign a first sample prediction 314. Second machine learning model 306 processes input 302 to assign a second sample prediction 316. Third machine learning model 308 processes input 302 to assign a third sample prediction 318.

In one example, each sample prediction is a predicted probability of the input 302 belonging to a positive class, given the features of the input 302: $P(Y=1|X)$, where P is the predicted probability, Y is the class prediction, and X is the input 302 (which may be structured, for example, as a vector of features).

As described herein, the machine learning models of the plurality of machine learning models 310 may be a single type of models, or two or more different types of models. Although depicted here as comprising three models, the plurality of machine learning models 310 may comprise any number of models, for example, 100 models. Each model of the plurality of machine learning models 310 may beneficially operate in parallel, such as to reduce latency of uncertainty quantification by reducing inference time, such as to less than 200 milliseconds.

Furthermore, the plurality of machine learning models 310 are not aggregated, and as such no aggregated result is used for inference because such aggregation would result in a point-estimate for the binary class prediction, rather than the complete probability distribution for $P(Y=1|X)$. By providing the complete probability distribution, the uncertainty is quantified for a binary classification model.

At block 322, a probability distribution is fit to the plurality of sample predictions 320 to generate a probability distribution 324. In some embodiments, the probability distribution is a beta distribution. As described herein, the beta distribution is fit, e.g., during distribution, by determining the two shape hyperparameters: $\alpha$ and $\beta$.

In one example, fitting a beta distribution comprises determining $\alpha(X)$ and $\beta(X)$. In certain embodiments, $\alpha$ and $\beta$ may be estimated through the method of moments because closed-form expressions can be obtained. $\alpha$ and $\beta$ may be determined based on the mean (μ), and variance (var) of the distribution. Specifically, the sample mean and sample variance are the first two moments in the method of moments. Thus, $\alpha$ and $\beta$ may be estimated in a finite number of operations, in a computationally efficient manner. Beneficially, closed form expressions for method of moments estimations of $\alpha(X)$ and $\beta(X)$ may be used to reduce latency of the uncertainty quantification because the closed form expression allows estimation of hyperparameters $\alpha$ and $\beta$, and the beta distribution fit in a computationally efficient manner.

In certain embodiments, $\alpha$ and $\beta$ may be estimated through maximum likelihood estimation (MLE) and the hyperparameters $\alpha$ and $\beta$ calculate numerically. Probability distribution 324 comprises the complete probability distribution of $P(Y=1|X)$.

At block 326, the probability distribution 324 of the input 302 is utilized to generate a class prediction. For example, based on the expected value (mean), variance, and the like.

In some embodiments, a task may be performed based on the class prediction, for example, through integration and/or interfacing with a task component, such as task component 112 in FIG. 1. Some examples of such tasks include risk prediction, fraud prediction, propensity for customers to purchase a given product, ad-click prediction, and spam prediction, to name a few.

Beneficially, generating probability distribution 324 allows for improved uncertainty quantification, therefore improved confidence in performance of tasks. Furthermore, workflow 300 supports latency requirements by providing near real-time inference and uncertainty quantification through computational efficiency and parallelization.

Note that FIG. 3 is just one example of a workflow, and other workflows including fewer, additional, or alternative steps are possible consistent with this disclosure.

Example Uncertainty Quantification Method

Figure 4:
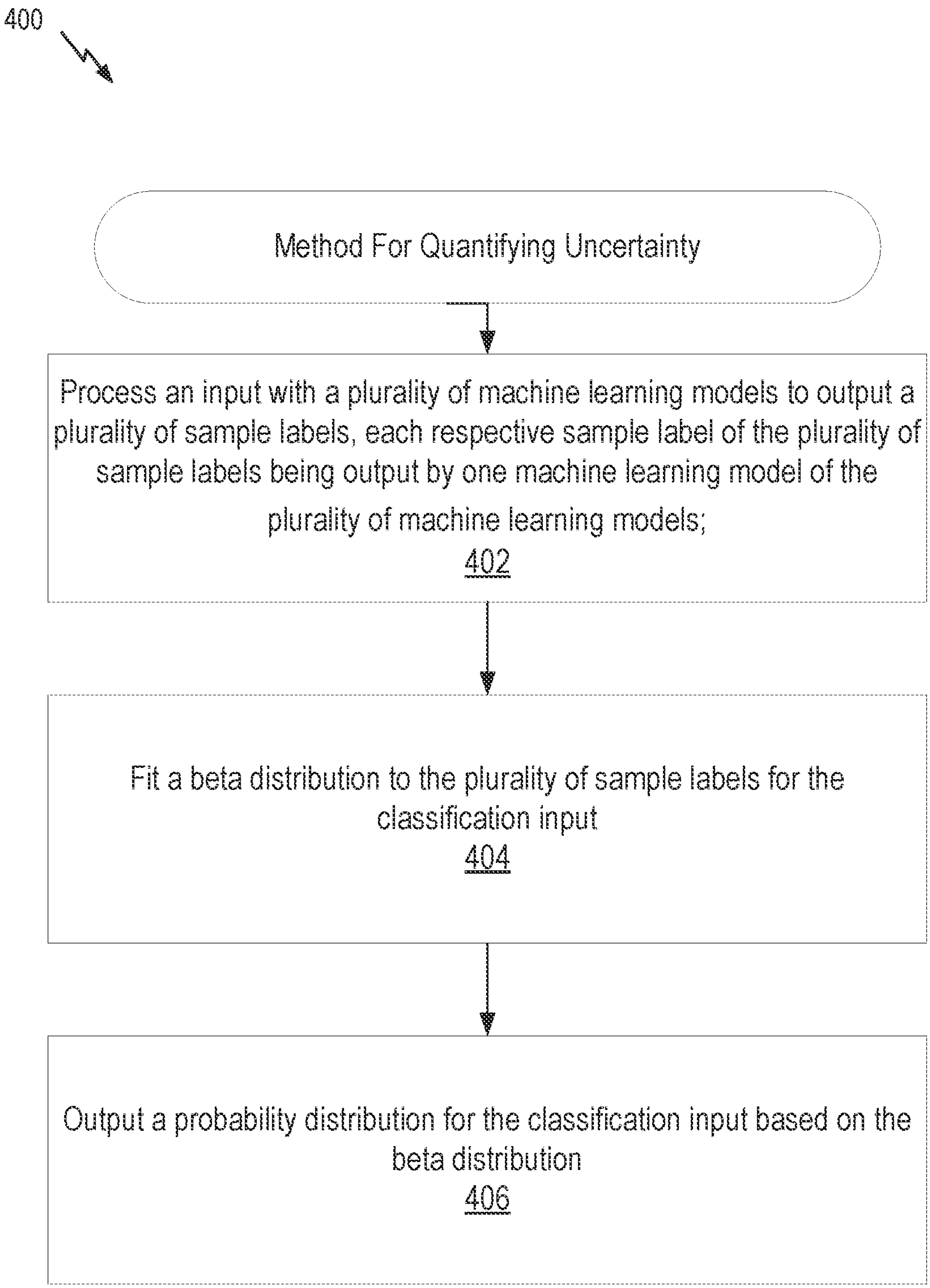
FIG. 4 depicts an example method for quantifying uncertainty with an uncertainty quantification system.

FIG. 4 depicts an example method 400 for quantifying uncertainty, such as with an uncertainty quantification system, for example, uncertainty quantification system 100 in FIG. 1.

Initially, method 400 begins at step 402 with processing an input, such as input 302 in FIG. 3, with a plurality of machine learning models, such as plurality of machine learning models 310, to output a plurality of sample predictions, such as plurality of sample predictions 320, each respective sample prediction of the plurality of sample predictions being outputted by one respective machine learning model of the plurality of machine learning models.

In some embodiments, wherein each model of the plurality of machine learning models comprises a single type of machine learning model, for example, random forest, xgboost, logistic regression, neural network, etc.

In some embodiments, wherein the plurality of machine learning models comprises at least two types of machine learning models, for example, at least two approaches of: random forest classification approach, xgboost classification approach, logistic regression classification approach, or neural network classification approach.

Method 400 proceeds to step 404 with fitting a beta distribution to the plurality of sample predictions for the input, for example, as described with respect to block 322 in FIG. 3, comprising: estimating a first hyperparameter for the beta distribution; and estimating a second hyperparameter for the beta distribution.

In some embodiments, estimating the first hyperparameter for the beta distribution comprises applying maximum likelihood estimation on the plurality of sample predictions for the input. In some embodiments, estimating the second hyperparameter for the beta distribution comprises applying maximum likelihood estimation on the plurality of sample predictions for the input.

In some embodiments, estimating the first hyperparameter for the beta distribution comprises applying method of moments on the plurality of sample predictions for the input. In some embodiments, estimating the second hyperparameter for the beta distribution comprises applying method of moments on the plurality of sample predictions for the input.

Method 400 then proceeds to step 406 with outputting a probability distribution for the input based on the beta distribution, for example, as described with respect to block 326 in FIG. 3.

In some embodiments, method 400 further comprises generating a classification prediction for the input based on the probability distribution for the input, for example, as described with respect to block 326 in FIG. 3. In some embodiments, the probability distribution for the input comprises a mean and a standard deviation for the classification prediction of the input.

In some embodiments, method 400 further comprises performing a task based on the classification prediction. Some examples of such tasks include predicting risk, fraud, propensity for customers to purchase a given product, ad-click prediction, spam prediction, and many more. In some embodiments, the input comprises transaction data; the classification prediction comprises a fraudulent transaction prediction; and the task comprises flagging the transaction as fraudulent. In some embodiments, flagging the transaction as fraudulent includes denying the transaction.

Note that FIG. 4 is just one example of a method, and other methods including fewer, additional, or alternative steps are possible consistent with this disclosure.

Example Processing System for Uncertainty Quantification

Figure 5:
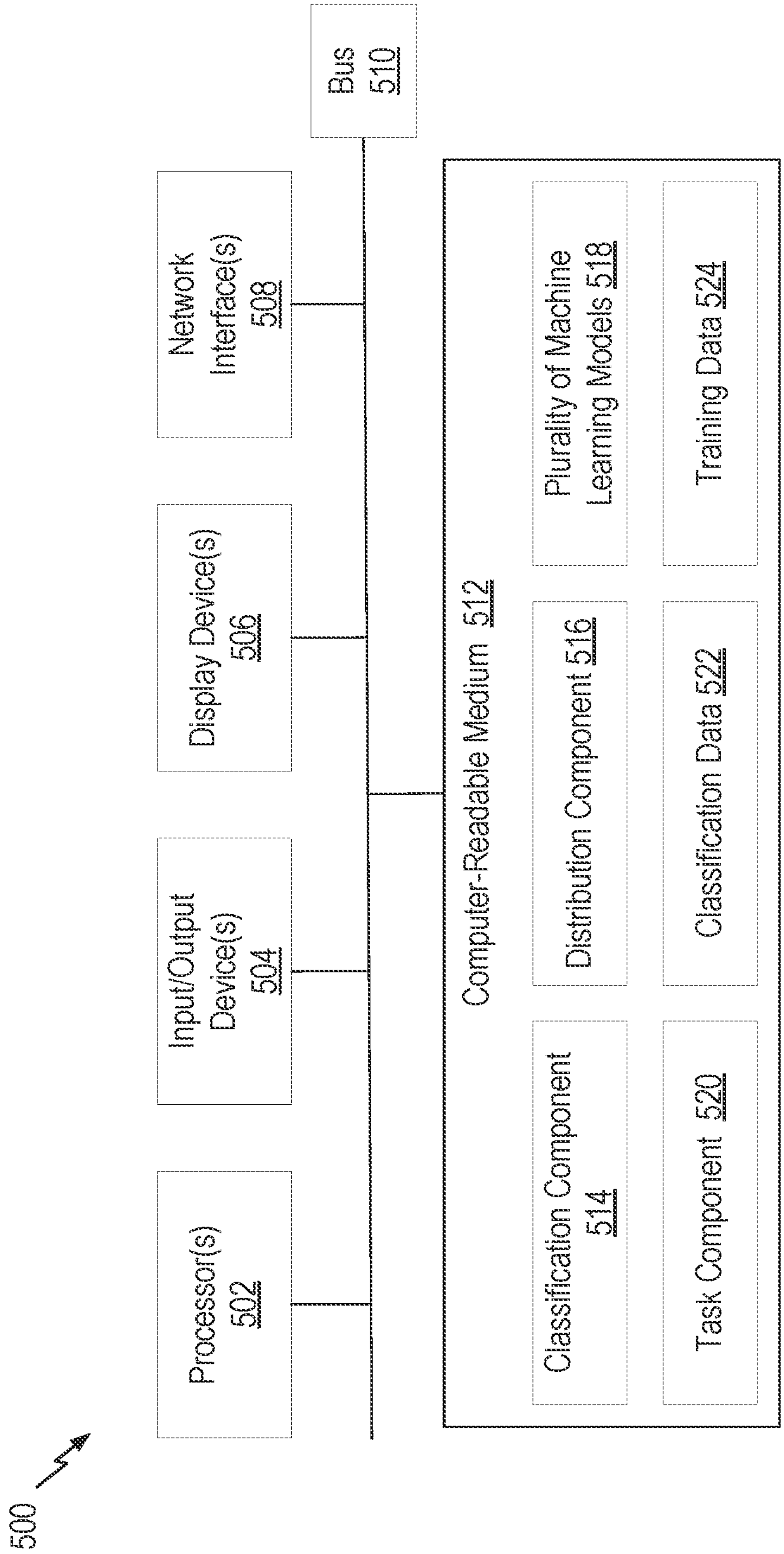
FIG. 5 depicts an example processing system with which aspects of the present disclosure can be performed.

FIG. 5 depicts an example processing system 500 configured to perform various aspects described herein, including, for example, workflow 200, workflow 300, and method 400 as described above with respect to FIGS. 2-4.

Processing system 500 is generally an example of an electronic device configured to execute computer-executable instructions, such as those derived from compiled computer code, including without limitation personal computers, tablet computers, servers, smart phones, smart devices, wearable devices, augmented and/or virtual reality devices, and others.

In the depicted example, processing system 500 includes one or more processors 502, one or more input/output devices 504, one or more display devices 506, one or more network interfaces 508 through which processing system 500 is connected to one or more networks (e.g., a local network, an intranet, the Internet, or any other group of processing systems communicatively connected to each other), and computer-readable medium 512. In the depicted example, the aforementioned components are coupled by a bus 510, which may generally be configured for data exchange amongst the components. Bus 510 may be representative of multiple buses, while only one is depicted for simplicity.

Processor(s) 502 are generally configured to retrieve and execute instructions stored in one or more memories, including local memories like computer-readable medium 512, as well as remote memories and data stores. Similarly, processor(s) 502 are configured to store application data residing in local memories like the computer-readable medium 512, as well as remote memories and data stores. More generally, bus 510 is configured to transmit programming instructions and application data among the processor(s) 502, display device(s) 506, network interface(s) 508, and/or computer-readable medium 512. In certain embodiments, processor(s) 502 are representative of one or more central processing units (CPUs), graphics processing unit (GPUs), tensor processing unit (TPUs), accelerators, and other processing devices.

Input/output device(s) 504 may include any device, mechanism, system, interactive display, and/or various other hardware and software components for communicating information between processing system 500 and a user of processing system 500. For example, input/output device(s) 504 may include input hardware, such as a keyboard, touch screen, button, microphone, speaker, and/or other device for receiving inputs from the user and sending outputs to the user.

Display device(s) 506 may generally include any sort of device configured to display data, information, graphics, user interface elements, and the like to a user. For example, display device(s) 506 may include internal and external displays such as an internal display of a tablet computer or an external display for a server computer or a projector. Display device(s) 506 may further include displays for devices, such as augmented, virtual, and/or extended reality devices. In various embodiments, display device(s) 506 may be configured to display a graphical user interface.

Network interface(s) 508 provide processing system 500 with access to external networks and thereby to external processing systems. Network interface(s) 508 can generally be any hardware and/or software capable of transmitting and/or receiving data via a wired or wireless network connection. Accordingly, network interface(s) 508 can include a communication transceiver for sending and/or receiving any wired and/or wireless communication.

Computer-readable medium 512 may be a volatile memory, such as a random access memory (RAM), or a nonvolatile memory, such as nonvolatile random access memory (NVRAM), or the like. In this example, computer-readable medium 512 includes a classification component 514, a distribution component 516, a plurality of machine learning models 518, a task component 520, classification data 522, and training data 524.

In certain embodiments, component 514 is configured to classify data through inference with uncertainty quantification, as described herein. Component 514 is further configured to generate, train, and utilize a plurality of machine learning models 518 to generate sample predictions. Plurality of machine learning models 518 may be trained using training data 524.

In certain embodiments, component 516 is configured to generate and output a probability distribution and class labels as part of classification data 522. Component 516 is further configured to fit a beta distribution to sample predictions, for example, generated by component 514, by estimating one or more hyperparameters for the beta distribution.

In certain embodiments, component 516 is configured to perform a task based on the classification prediction and probability distribution generated by component 516.

Note that FIG. 5 is just one example of a processing system consistent with aspects described herein, and other processing systems having additional, alternative, or fewer components are possible consistent with this disclosure.

EXAMPLE CLAUSES

Implementation examples are described in the following numbered clauses:

Clause 1: A method for quantifying uncertainty, comprising: processing an input with a plurality of machine learning models to output a plurality of sample predictions, each respective sample prediction of the plurality of sample predictions being outputted by one respective machine learning model of the plurality of machine learning models; fitting a beta distribution to the plurality of sample predictions for the input, comprising: estimating a first hyperparameter for the beta distribution; and estimating a second hyperparameter for the beta distribution; and outputting a probability distribution for the input based on the beta distribution.

Clause 2: The method of Clause 1, further comprising generating a classification prediction for the input based on the probability distribution for the input.

Clause 3: The method of Clause 2, further comprising performing a task based on the classification prediction.

Clause 4: The method of Clause 3, wherein: the input comprises transaction data; the classification prediction comprises a fraudulent transaction prediction; and the task comprises flagging the transaction as fraudulent.

Clause 5: The method of any one of Clauses 1-4, wherein the probability distribution for the input comprises a mean and a standard deviation for the classification prediction of the input.

Clause 6: The method of any one of Clauses 1-5, wherein: estimating the first hyperparameter for the beta distribution comprises applying maximum likelihood estimation on the plurality of sample predictions for the input; and estimating the second hyperparameter for the beta distribution comprises applying maximum likelihood estimation on the plurality of sample predictions for the input.

Clause 7: The method of any one of Clauses 1-5, wherein: estimating the first hyperparameter for the beta distribution comprises applying method of moments on the plurality of sample predictions for the input; and estimating the second hyperparameter for the beta distribution comprises applying method of moments on the plurality of sample predictions for the input.

Clause 8: The method of any one of Clauses 1-7, wherein each model of the plurality of machine learning models comprises a single type of machine learning model.

Clause 9: The method of any one of Clauses 1-7, wherein the plurality of machine learning models comprises at least two types of machine learning models.

Clause 10: A processing system, comprising: a memory comprising computer-executable instructions; and a processor configured to execute the computer-executable instructions and cause the processing system to perform a method in accordance with any one of Clauses 1-9.

Clause 11: A processing system, comprising means for performing a method in accordance with any one of Clauses 1-9.

Clause 12: A non-transitory computer-readable medium storing program code for causing a processing system to perform the steps of any one of Clauses 1-9.

Clause 13: A computer program product embodied on a computer-readable storage medium comprising code for performing a method in accordance with any one of Clauses 1-9.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for quantifying uncertainty, comprising:

processing an input with a plurality of machine learning models to output a plurality of sample predictions, each respective sample prediction of the plurality of sample predictions being outputted by one respective machine learning model of the plurality of machine learning models;

fitting a beta distribution to the plurality of sample predictions for the input, comprising:

estimating a first hyperparameter for the beta distribution; and estimating a second hyperparameter for the beta distribution; and outputting a probability distribution for the input based on the beta distribution.

2. The method of claim 1, further comprising generating a classification prediction for the input based on the probability distribution for the input.

3. The method of claim 2, further comprising performing a task based on the classification prediction.

4. The method of claim 3, wherein:

the input comprises transaction data;

the classification prediction comprises a fraudulent transaction prediction; and the task comprises flagging the transaction as fraudulent.

5. The method of claim 2, wherein the probability distribution for the input comprises a mean and a standard deviation for the classification prediction of the input.

6. The method of claim 1, wherein:

estimating the first hyperparameter for the beta distribution comprises applying maximum likelihood estimation on the plurality of sample predictions for the input; and estimating the second hyperparameter for the beta distribution comprises applying maximum likelihood estimation on the plurality of sample predictions for the input.

7. The method of claim 1, wherein:

estimating the first hyperparameter for the beta distribution comprises applying method of moments on the plurality of sample predictions for the input; and estimating the second hyperparameter for the beta distribution comprises applying method of moments on the plurality of sample predictions for the input.

8. The method of claim 1, wherein each model of the plurality of machine learning models comprises a single type of machine learning model.

9. The method of claim 1, wherein the plurality of machine learning models comprises at least two types of machine learning models.

10. A method for quantifying uncertainty, comprising:

processing an input with a plurality of machine learning models to output a plurality of sample predictions, each respective sample prediction of the plurality of sample predictions being outputted by one respective machine learning model of the plurality of machine learning models;

fitting a beta distribution to the plurality of sample predictions for the input, comprising:

estimating a first hyperparameter for the beta distribution comprising applying method of moments on the plurality of sample predictions for the input; and estimating a second hyperparameter for the beta distribution comprising applying method of moments on the plurality of sample predictions for the input;

outputting a probability distribution for the input based on the beta distribution; and generating a classification prediction for the input based on the probability distribution for the input.

11. The method of claim 9, wherein each model of the plurality of machine learning models comprises a single type of machine learning model.

12. The method of claim 9, wherein the plurality of machine learning models comprises at least two types of machine learning models.

13. A processing system comprising: a memory comprising computer-executable instructions; and a processor configured to execute the computer-executable instructions and cause the processing system to:

process an input with a plurality of machine learning models to output a plurality of sample predictions, each respective sample prediction of the plurality of sample predictions being outputted by one respective machine learning model of the plurality of machine learning models;

fit a beta distribution to the plurality of sample predictions for the input, comprising:

estimate a first hyperparameter for the beta distribution; and estimate a second hyperparameter for the beta distribution; and output a probability distribution for the input based on the beta distribution.

14. The processing system of claim 13, wherein the processor is further configured to cause the processing system to generate a classification prediction for the input based on the probability distribution for the input.

15. The processing system of claim 14, wherein the processor is further configured to cause the processing system to perform a task based on the classification prediction.

16. The processing system of claim 14, wherein the probability distribution for the input comprises a mean and a standard deviation for the classification prediction of the input.

17. The processing system of claim 13, wherein:

in order to estimate the first hyperparameter for the beta distribution the processor is further configured to cause the processing system to apply maximum likelihood estimation on the plurality of sample predictions for the input; and in order to estimate the second hyperparameter for the beta distribution the processor is further configured to cause the processing system to apply maximum likelihood estimation on the plurality of sample predictions for the input.

18. The processing system of claim 13, wherein:

in order to estimate the first hyperparameter for the beta distribution the processor is further configured to cause the processing system to apply method of moments on the plurality of sample predictions for the input; and in order to estimate the second hyperparameter for the beta distribution the processor is further configured to cause the processing system to apply method of moments on the plurality of sample predictions for the input.

19. The processing system of claim 13, wherein each model of the plurality of machine learning models comprises a single type of machine learning model.

20. The processing system of claim 13, wherein the plurality of machine learning models comprises at least two types of machine learning models.

* * * * *